United States Patent
Kahl et al.

(10) Patent No.: US 6,788,784 B1
(45) Date of Patent: Sep. 7, 2004

(54) CIRCUIT ARRANGEMENT FOR SIGNALING IN TELECOMMUNICATIONS NETWORKS

(75) Inventors: Alexander Kahl, Villach (AT); Jorg Hauptmann, Wenrberg (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/889,115

(22) PCT Filed: Jan. 5, 2000

(86) PCT No.: PCT/DE00/00045

§ 371 (c)(1),
(2), (4) Date: Sep. 24, 2001

(87) PCT Pub. No.: WO00/42758

PCT Pub. Date: Jul. 20, 2000

(30) Foreign Application Priority Data

Jan. 15, 1999 (DE) ......... 199 01 463

(51) Int. Cl.⁷ .............. H04M 1/00
(52) U.S. Cl. ......... 379/398; 379/231; 379/399.01
(58) Field of Search .......... 379/30, 23, 231, 379/232, 234, 240, 394, 398, 399.01, 399.02

(56) References Cited

U.S. PATENT DOCUMENTS 4,190,745 A 2/1980 Jusinskas, Jr. et al.
4,311,879 A * 1/1982 Brush .......... 379/231
5,500,894 A 3/1996 Hershbarger

FOREIGN PATENT DOCUMENTS

| EP | 0467367 A1 | 1/1992 |
| EP | 0467367 B1 | 1/1997 |
| EP | 0991 218 A2 | 4/2000 |

* cited by examiner

Primary Examiner—Minsun Oh Harvey
Assistant Examiner—Jefferey Harold
(74) Attorney, Agent, or Firm—Welsh & Katz, Ltd.

(57) ABSTRACT

A circuit arrangement for signaling in telecommunications networks has a first connection and a second connection for a first and a second conductor, respectively, in a transmission line. The first connection is connected to the first input of a rectifier, and the second connection is connected to the second input of said rectifier. The positive output and the negative output of the rectifier are connected to one another via a variable resistance. A third connection for a third conductor in the transmission line can be connected via the series circuit formed by a switch and a first diode to the positive output of the rectifier, and via the series circuit formed by the switch and a second diode to the negative output of the rectifier.

8 Claims, 2 Drawing Sheets

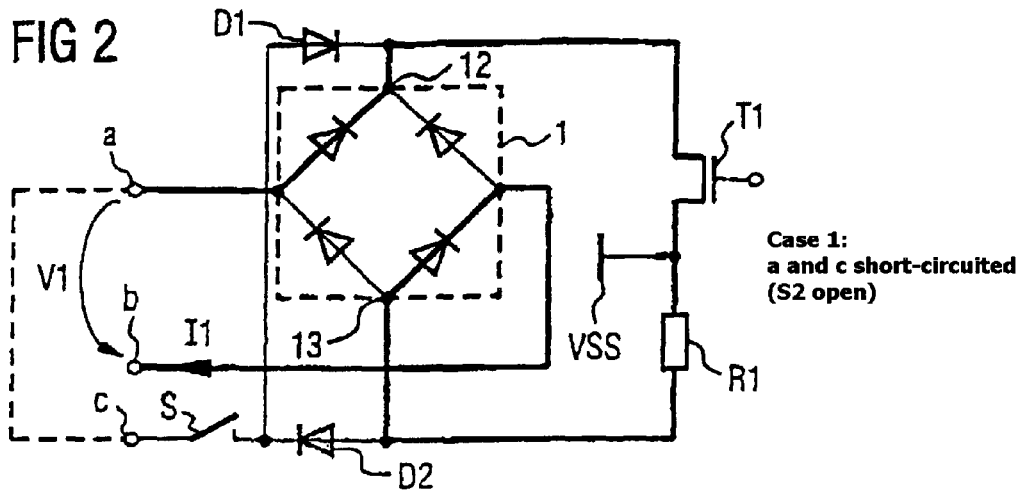
Case 1:
a and c short-circuited
(S2 open)
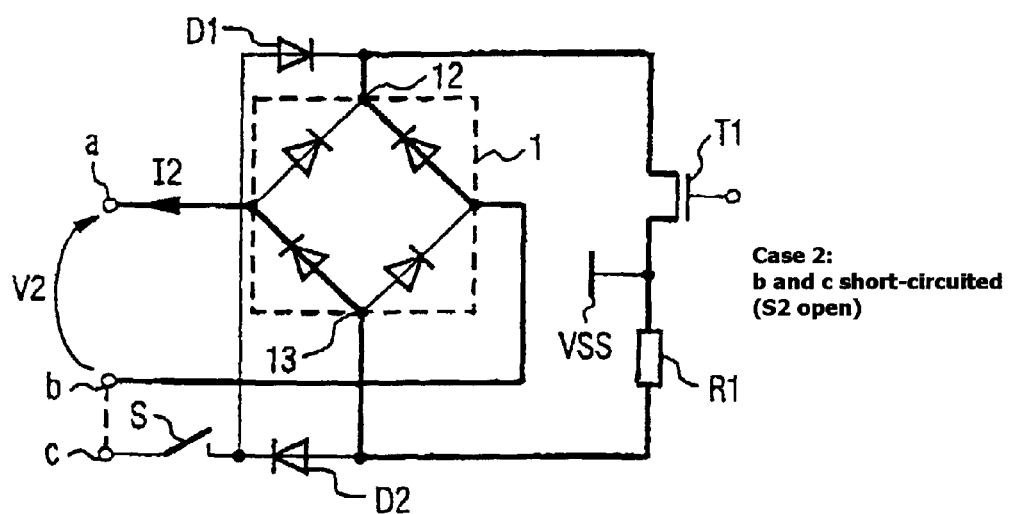
Case 2:
b and c short-circuited
(S2 open)
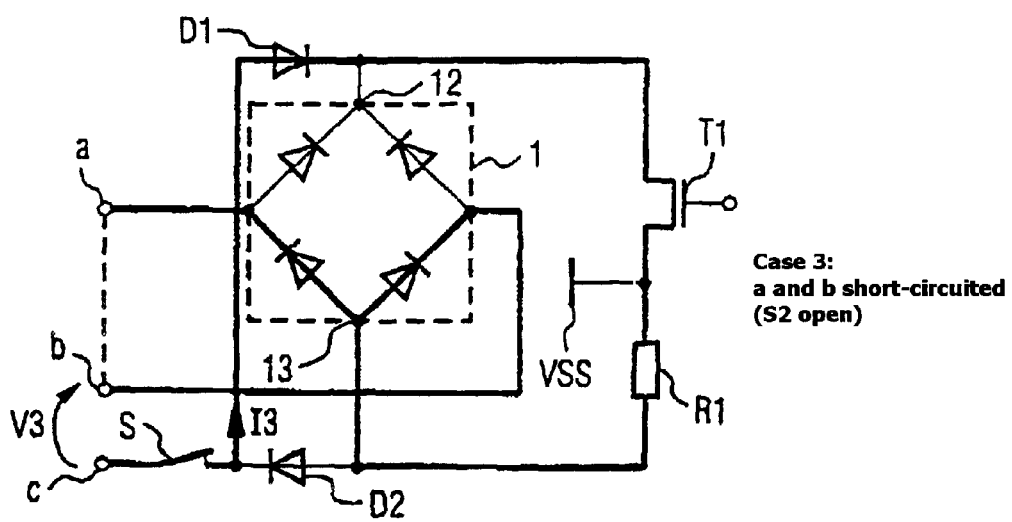
Case 3:
a and b short-circuited
(S2 open)

CIRCUIT ARRANGEMENT FOR SIGNALING IN TELECOMMUNICATIONS NETWORKS

BACKGROUND OF THE INVENTION

The invention relates to a circuit arrangement for signaling in telecommunications networks, as claimed in the preamble of patent claim 1, and as is known from U.S. Pat. No. 4,190,745.

Private branch exchanges (PBX), digital multichannel transmission systems (DAML=Digital Added Main Line) or digital transmission systems (DLC=Digital Loop Carrier) have functions for signaling operating states. For this purpose resistances are connected between the individual transmission lines by, for example, a private branch exchange. A switching center, which is connected to the private branch exchange, then applies a voltage between one line and the other lines, which are short-circuited, and measures the resultant currents through the lines. The switching center can use the measured currents to deduce the resistances connected between the individual transmission lines. By varying the resistance values, for example, the private branch exchange can transmit information about operating states to the switching center. For example, in this case, it is possible to signal whether a voice transmission or a data transmission is intended to take place. Alternatively, the switching center can find out whether the transmission lines are faulty. In this case, however, different resistance values must be provided and the resistance values must be matched to specific national requirements for the transmission lines, particularly when using public telecommunications network transmission lines.

If there are three transmission lines, the measurement is carried out by using switches, which are preferably in the form of relays, to connect resistances between the transmission lines. Two transmission lines are in each case short-circuited to one another, as a result of which two resistances are in each case connected in parallel. The switching center applies a voltage to the remaining transmission lines. The resultant currents through the transmission lines and resistances are measured, and the resistance values are calculated from them. The calculation results are also referred to as a signature. A signature makes it possible, for example, to deduce the state of the transmission lines or a specific operating state. If one of the transmission lines is broken, then no current can flow via this line and the resistance value determined by the switching center in this measurement, or the signature, does not match the predetermined resistance value or the signature for an uninterrupted line. A disadvantage in this case is that the relays for connecting the resistances between the transmission lines are expensive. A correspondingly large number of resistances must be provided if there are a number of different signatures. Furthermore, a resistance must be provided for each transmission line, and these resistances must be matched to the specific national requirements. It is either necessary to construct different circuits for different resistance values, or parallel resistance paths must be provided, with a correspondingly large number of relays.

A circuit arrangement for detecting faults on a subscriber line is known from U.S. Pat. No. 4,710,949, which uses switches that are sensitive to voltage and current and are connected in the lines. A disadvantage in this case is, however, that these switches are highly complex and are thus expensive. Furthermore, these switches can influence the transmission of signals.

The invention is thus based on the technical problem of specifying a circuit arrangement for signaling in telecommunications networks which, firstly, can be matched to different requirements and, secondly, can be constructed with little circuitry complexity.

This object is achieved by a circuit arrangement for signaling in telecommunications networks having the features of patent claim 1. Advantageous refinements of the circuit arrangement can be found in the respective dependent claims.

SUMMARY OF THE INVENTION

A circuit arrangement for signaling in telecommunications networks has a first connection and a second connection for a first and a second conductor, respectively, in a transmission line. The first connection is connected to the first input of a rectifier, and the second connection is connected to the second input of said rectifier. The positive output and the negative output of the rectifier are connected to one another via a variable resistance. A third connection for a third conductor in the transmission line can be connected via the series circuit formed by a switch and a first diode to the positive output of the rectifier, and via the series circuit formed by the switch and a second diode to the negative output of the rectifier.

The control loop, the rectifier and the transistor and resistance are used for setting a line impedance during normal operation of a line circuit which, for example, links a digital subscriber circuit to an analog transmission line. Thus, advantageously, the invention provides a circuit arrangement for signaling in telecommunications networks with little additional circuitry complexity—two diodes and one switch. Instead of having to provide a specific resistance for testing each conductor in a transmission line, which is connected by means of a relay between two conductors in the transmission line for testing, already existing circuits are provided with additional circuits for testing the transmission line.

In one preferred embodiment, a control loop is provided to which a first voltage, which is produced at the positive output of the rectifier, and a second voltage, which is produced at the negative output of the rectifier, are supplied. The control loop produces a control voltage which controls the variable resistance. The transfer function of the control loop is variable. A particularly advantageous feature in this case is that the capability to vary the transfer function of the control loop makes it possible to vary the variable resistance, and thus the resistance between two conductors in the transmission line, during testing. The circuit arrangement can thus be matched to specific national requirements, and different signatures can be produced, without changing the circuitry.

It is particularly preferable for the variable resistance to have a transistor.

The cathode of the first diode is preferably connected to the positive output of the rectifier, and the anode of the second diode is preferably connected to the negative output of the rectifier.

The control loop preferably has a digital filter, with the transfer function of the control loop being variable by programming the filter coefficients of the digital filter. It is particularly preferable in this case for the digital filter to be formed by an appropriately programmed digital signal processor.

In one preferred embodiment, the control loop has an analog integrator circuit which is connected upstream of the transistor and integrates the difference between a first input voltage and a second input voltage, and whose output signal controls the transistor.

It is particularly preferable for the transistor to be an n-channel MOSFET.

The circuit arrangement for signaling in telecommunications networks is also suitable for being added to an integrated circuit, by virtue of the use of electronic components. In this case, of course, all the other circuits, such as the control loop, the rectifier and the transistor and resistors, can also be integrated at the same time.

Further advantages, features and application options for the invention will become evident from the following description of exemplary embodiments in conjunction with the drawing. In the drawing:

BRIEF SUMMARY OF DRAWINGS

FIG. 2 shows three different operating states of the circuit arrangement, in order to detect line interruptions.

DETAILED DESCRIPTION

Figure 1:
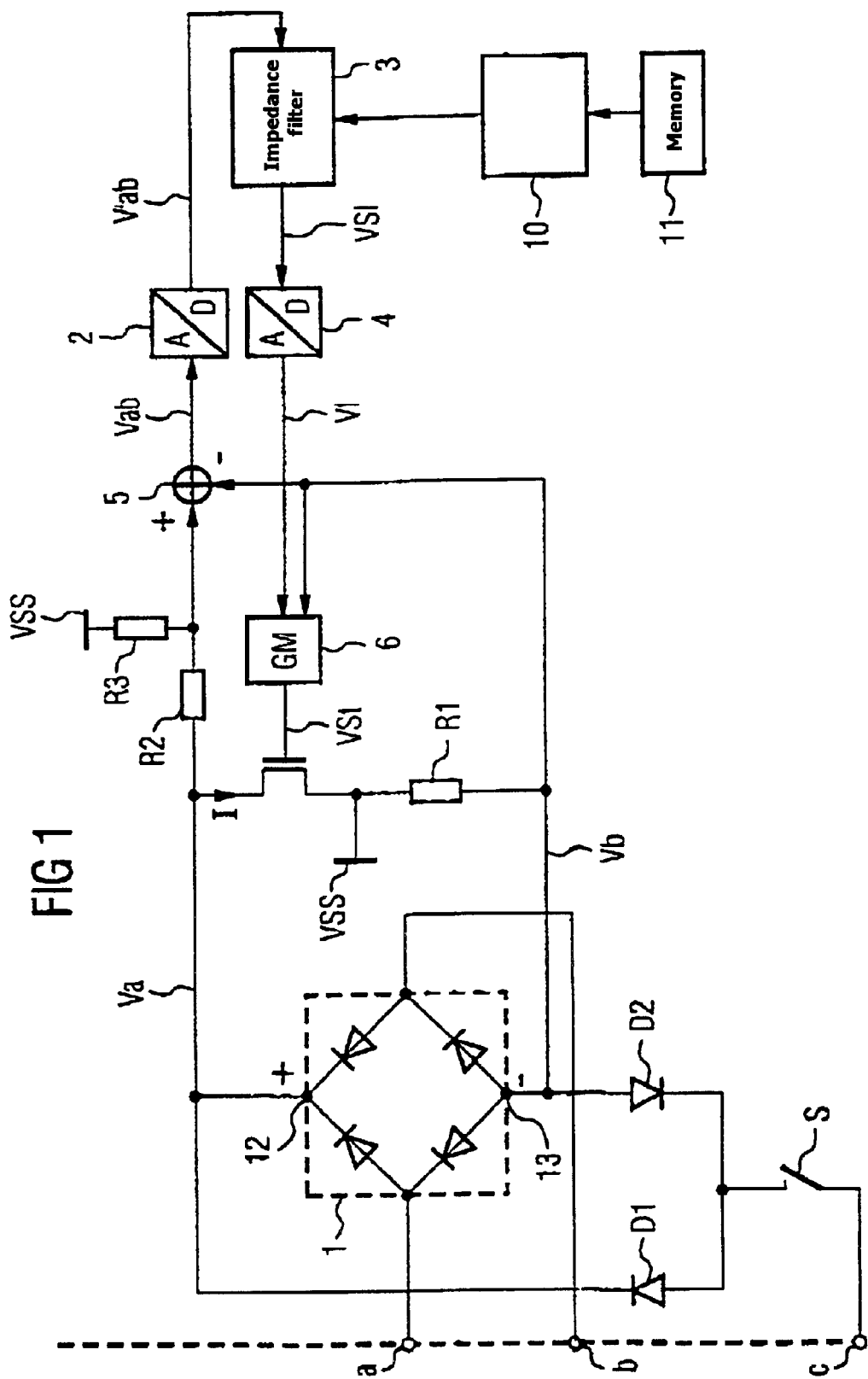
FIG. 1 shows an exemplary embodiment of a circuit arrangement for signaling in telecommunications networks.

The circuit arrangement illustrated in FIG. 1 for signaling in telecommunications networks has three connections a, b and c, which can be connected to a three-conductor transmission line. The transmission line may, for example, comprise a two-conductor a/b conductor for transmitting signals, and a ground line c.

The circuit arrangement for signaling is used in a chip set for connection of a digital subscriber circuit (DSL=Digital Subscriber Line) to an analog telephone line (transmission line). The chip set in this case converts the signals on the analog telephone line to digital signals for further processing by the digital subscriber circuit and, conversely, converts digital signals to analog signals for the digital subscriber circuit for transmission via the analog telephone line.

A switching center can apply various signaling voltages via the transmission line. To do this, the switching center short-circuits two of the three conductors in the transmission line. Furthermore, the circuit arrangement for signaling connects a resistance between the remaining conductor and the two short-circuited conductors. The switching center applies a voltage between the remaining conductor and the two short-circuited conductors. A current flowing via the conductors is measured by the switching center, and this is used to calculate a resistance. If there are no faults on the lines, the calculated resistance will be within a specific predetermined range. In this case, the predetermined range is defined by specific national requirements.

The connections a and b of the circuit arrangement for signaling are connected to a first input and a second input, respectively, of a bridge rectifier 1. A first output 12 and a second output 13 of the bridge rectifier can be connected, respectively, via a first diode D1 and a switch S to the third connection c of the circuit arrangement for signaling and via a second diode D2 and the switch S to the third connection c of said circuit arrangement for signaling. The n-connection of the first diode D1 is in this case connected to the first output 12 of the rectifier 1. The p-connection of the second diode D2 is connected to the second output 13 of the rectifier 1.

The first output 12 of the bridge rectifier 1 is connected to a reference ground potential VSS via the load path of a transistor T1. The second output 13 of the bridge rectifier 1 is connected to the reference ground potential VSS via a resistance R1.

A voltage which is present between the connections a and b is rectified by the bridge rectifier 1. A rectified positive voltage Va is produced at the first output 12 of the bridge rectifier 1. A rectified negative voltage Vb is produced at the second output 13 of the bridge rectifier 1.

The rectified positive voltage Va, whose voltage levels are high, is subdivided via a voltage divider R2 and R3 to produce a lower voltage, in order to avoid overdriving the downstream circuits, in which the signal voltage levels are only low in comparison to the rectified positive voltage.

After being divided, the positive voltage Va and the negative voltage Vb are supplied to a subtraction circuit 5, at whose output a difference voltage Vab is produced.

The difference voltage Vab is then sampled by an analog/digital converter 2 at a sampling rate fs and is converted to a digital signal V' ab.

The digital output signal V' ab from the analog/digital converter 2 is supplied to a digital filter 3. The digital filter 3 can be programmed by a digital control device 10 for matching to specific national requirements and, for this purpose, has a programmable transfer function k. In this case, the digital filter 4 may be in the form of digital hardware, in which the coefficients are programmable. The digital filter may likewise be in the form of a signal processing algorithm in a digital signal processor, in which case the filter function can be adjusted by means of variables.

The output signal VSI from the digital filter 4 is converted by a digital/analog converter 4 to an analog signal VI.

The analog signal VI is supplied to a first input of an analog integrator circuit 6. The negative voltage Vb is supplied via a second input to the analog integrator circuit 6. The analog integrator circuit 6 uses the two input signals to form a difference, which is then integrated. The voltage VSt is produced at the output of the analog integrator circuit 6, and is passed to the control connection of the transistor T1. A line current I is set via the transistor T1. The analog integrator circuit 6 integrates the difference voltage VI−Vb until the difference voltage VI−Vb becomes zero. Thus, from Vb=R1*I=VI, it is possible to derive a conductance value GM=I/VI=1/R1 for the analog integrator circuit 6.

FIG. 2 shows three different cases for testing the transmission line. Two conductors in the transmission line are in each case short-circuited for each case, corresponding to the two illustrated connections, which are annotated by means of a dashed line as being connected to one another. The switching center applies a voltage between the short-circuited connections and the remaining conductor, or the remaining connection.

Case 1: The connections a and c are short-circuited. A first voltage V1 is applied between the connection b and the short-circuited connections a and c. The switch S is opened. A first current I1 flows via the path marked by a bold line. A resistance V1/I1 can be calculated from the first voltage V1 and the first current I1, and this is governed by the resistance of the load path through the first transistor T1 and the resistance R1.

Case 2: The connections b and c are shorted-circuited. A second voltage V2 is applied between the connection a and the short-circuited connections b and c. The switch S is opened. A second current I2 flows via the path marked by a bold line. A resistance V2/I2 can once again be calculated from the second voltage V2 and the second current I2, and this is governed by the resistance of the load path through the first transistor T1 and the resistance R1.

Case 3: The connections a and b are short-circuited. A third voltage V3 is applied between the connection c and the short-circuited connections a and b. In this case, the switch S is closed. A third current I3 flows via the path marked by a bold line. A resistance V3/I3 can once again be calculated from the third voltage V3 and the third current I3, and this is governed by the resistance of the load path through the first transistor T1 and the resistance R1.

One conductor in the transmission line is tested in each of the three cases. If the calculated resistance differs from a predetermined value in one of the three cases, then there is a faulty transmission line. Since the calculated resistance value depends on the resistance of the load path through the first transistor T1 and the resistance R1, the resistance of the load path through the transistor T1 can be matched to (for example) specific national requirements by programming the transfer function of the digital filter 3. For this purpose, specific national values for the predetermined resistance can be stored in a memory 11. To this end, the digital control device 10 reads from the memory 11 the values required for programming the specific national resistance, and changes the programming of the digital filter 3 accordingly.

What is claimed is:

1. A circuit arrangement for signaling in telecommunications networks, with a first connection (a) and a second connection (b) for a first and a second conductor, respectively, in a transmission line being connected to the first input and to the second input, respectively, of a rectifier, and with the positive output and the negative output of the rectifier being connected to one another via a variable resistance wherein a third connection (c) for a third conductor in the transmission line can be connected via the series circuit formed by a switch and a first diode to the positive output of the rectifier, and via the series circuit formed by the switch and a second diode to the negative output of the rectifier.

2. The circuit arrangement as claimed in claim 1, wherein a control loop is provided to which a first voltage, which is produced at the positive output of the rectifier, and a second voltage, which is produced at the negative output of the rectifier, are supplied, and the control loop produces a control voltage which controls the variable resistance, and with the transfer function of the control loop being variable.

3. The circuit arrangement as claimed in claim 1, wherein the variable resistance has a transistor.

4. The circuit arrangement as claimed in claim 3, wherein the cathode of the first diode is connected to the positive output of the rectifier, and the anode of the second diode is connected to the negative output of the rectifier.

5. The circuit arrangement as claimed in claim 2, wherein the control loop has a digital filter, with the transfer function of the control loop being variable by programming the filter coefficients of the digital filter.

6. The circuit arrangement as claimed in claim 5, wherein the digital filter is formed by an appropriately programmed digital signal processor.

7. The circuit arrangement as claimed in claim 3, wherein the control loop has an analog integrator circuit which is connected upstream of the transistor and integrates the difference between a first and a second input voltage, and whose output signal controls the transistor.

8. The circuit arrangement as claimed in claim 3, wherein the transistor is an n-channel MOSFET.

* * * * *